United States Patent
Clark

[11] 3,708,069
[45] Jan. 2, 1973

[54] REVERSE OSMOSIS MEMBRANE MODULE AND APPARATUS USING THE SAME

[75] Inventor: George B. Clark, Waukesha, Wis.
[73] Assignee: Aqua-Chem, Inc.
[22] Filed: Aug. 13, 1970
[21] Appl. No.: 63,561

[52] U.S. Cl. ................... 210/181, 210/321, 210/433
[51] Int. Cl. .............................................. B01d 31/00
[58] Field of Search ........ 210/181, 416, 23, 321, 433, 210/323

[56] References Cited

UNITED STATES PATENTS 3,369,667  2/1968  Clark et al. ..................... 210/321 X Primary Examiner—Frank A. Spear, Jr.
Attorney—Fred Wiviot and Ralph G. Hohenfeldt

[57] ABSTRACT

A reverse osmosis membrane module and a self-contained unit for separating the components of a liquid mixture by reverse osmosis utilizing the same. The module includes an elongated tubular casing having substantial hoop strength which receives a plurality of elongated tubular membrane structures. Within the casing are a plurality of thin-walled tubes each surrounding and receiving an associated one of the tubular membranes. According to one embodiment, the outer surface of each thin-walled tube is configured as a hexagon and the tubes are interfitted within the casing with each other so that each is in contact with another tube or the casing about its entire peripheral extent. Thus, the pressure within adjacent tubes tends to balance out thereby obviating any requirement for support tubes for the membranes of substantial strength. The self-contained unit employs such a membrane module and within the casing there is further included a motor driven pump which receives a liquid mixture and elevates the pressure of the same to reverse osmosis operating pressures. Each of the membrane cells defined by the tubular membranes has one open end adjacent a high pressure area which receives the liquid mixture under high pressure and another open end adjacent a second high pressure area to permit recirculation of the liquid mixture. Within the first high pressure area there is provided an impeller which is driven by the pump motor together with baffles which operate to recirculate the liquid mixture through the membrane cells. The structure also includes an accumulator for dampening pressure pulses within the casing caused by operation of the pump.

12 Claims, 6 Drawing Figures

PATENTED JAN 2 1973
3,708,069
SHEET 1 OF 2
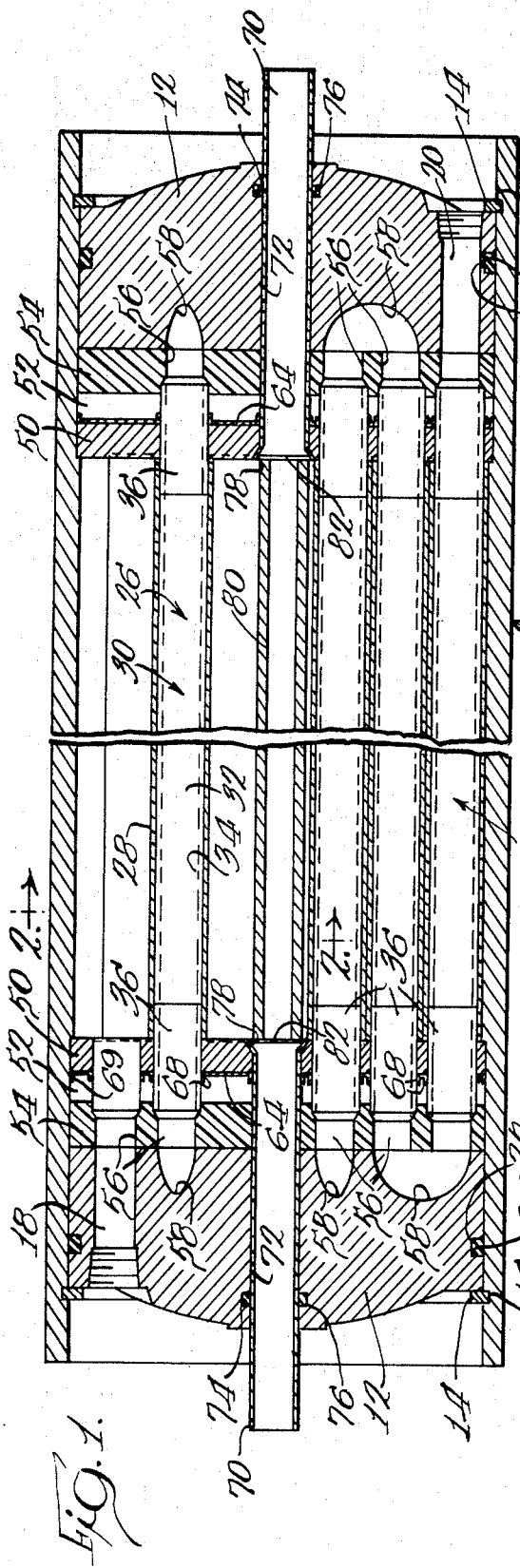
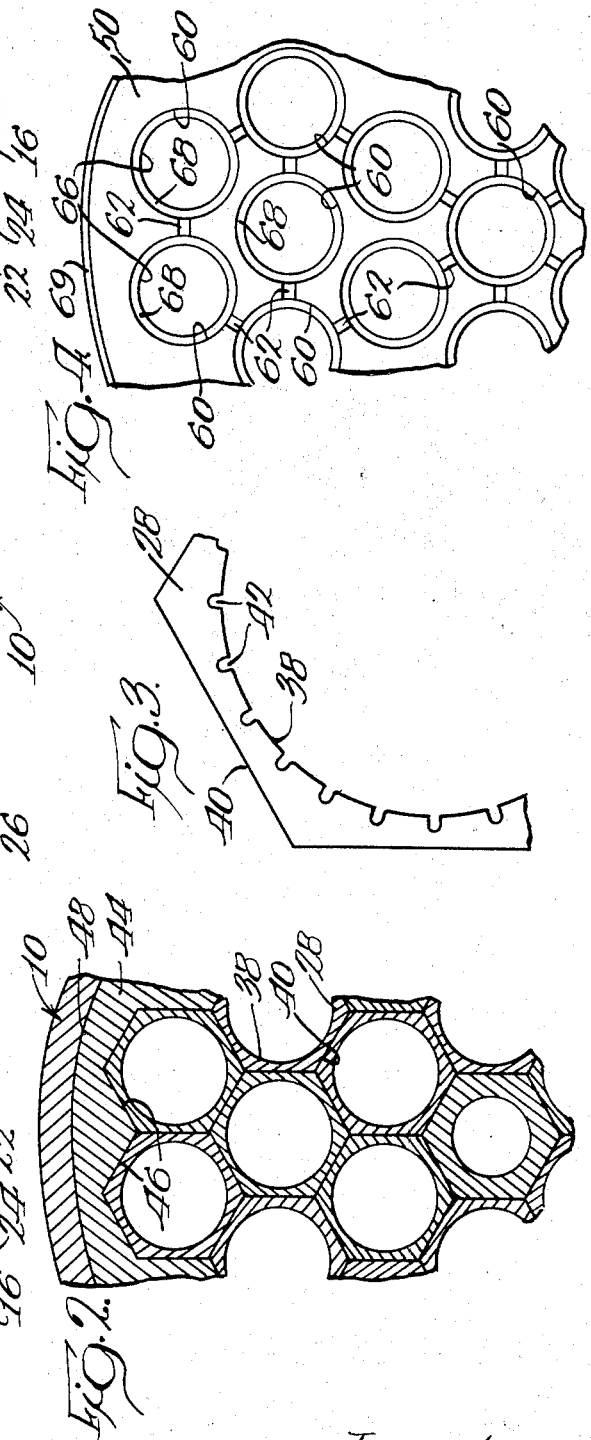
Inventor:
George B. Clark
By Hofgren, Wegner,
Allen, Stellman & McCord
Att'ys

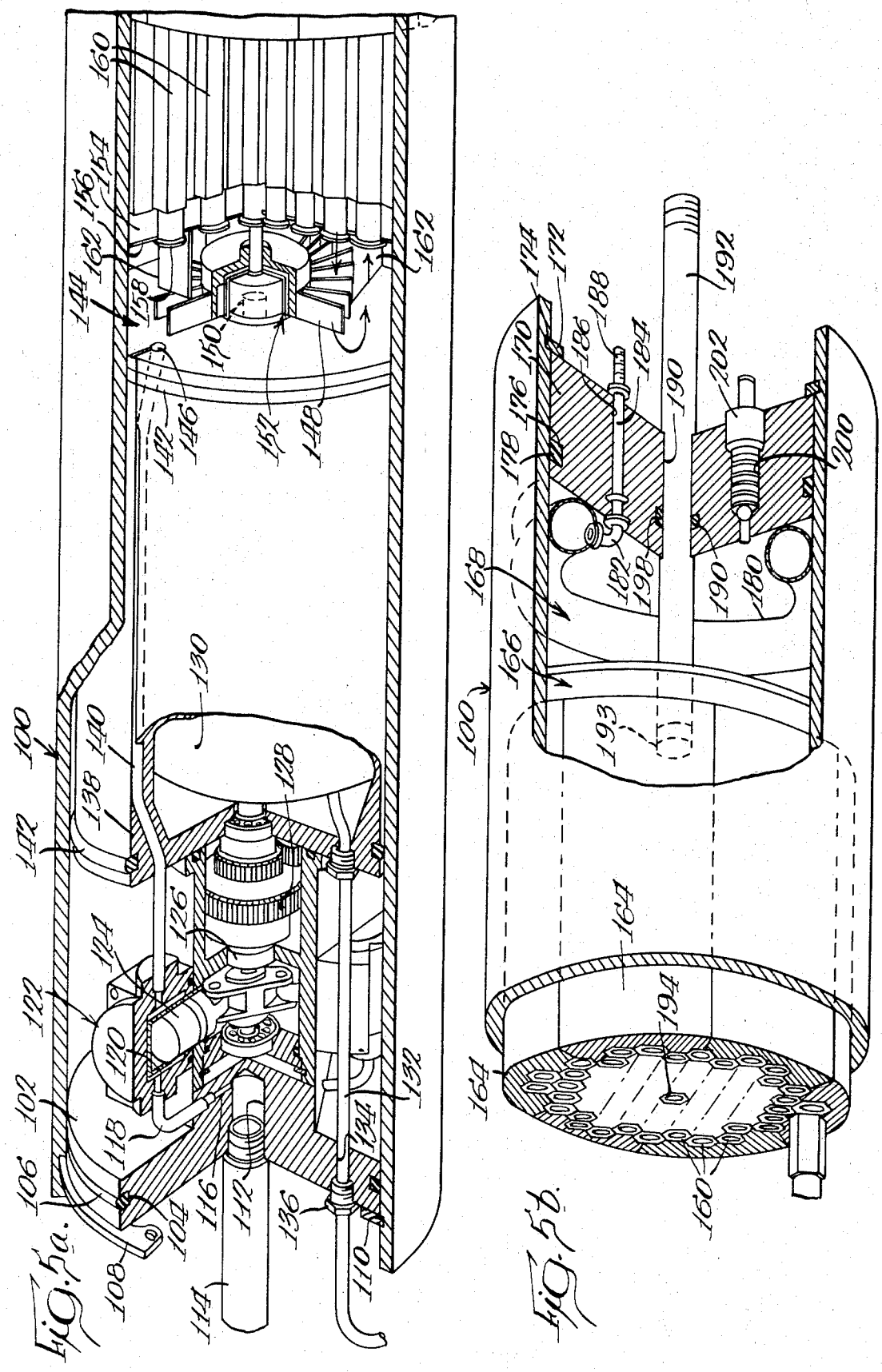

REVERSE OSMOSIS MEMBRANE MODULE AND APPARATUS USING THE SAME

BACKGROUND OF THE INVENTION

Increasing demand for relatively pure water for human or industrial consumption as well as concern over pollution due to the discharge of liquid industrial waste has in recent years resulted in increased exploration to find methods and means for purifying water and various industrial solvents. Many of the methods and means used for solvent separation are extremely costly both in terms of capital investment for equipment and power cost for operating equipment as well as maintenance costs and as a result, substantial investigation has focused on one potentially inexpensive method of solvent separation, namely, reverse osmosis.

In solvent separation by reverse osmosis, a liquid mixture, such as a solution, a slurry or a colloidal suspension, etc., is placed in contact with a semipermeable membrane while being subjected to a pressure in excess of the osmotic pressure of the liquid mixture. As a result, relatively pure solvent will pass through the membrane to be collected or disposed of as desired while the liquid mixture itself will be concentrated due to the removal of a portion of the solvent therefrom.

The pressures employed naturally depend, in a large part, upon the liquid mixture being processed and in many applications, are substantial. For example, the osmotic pressure of seawater is about 350 pounds per square inch and quite typically, seawater will be subjected to reverse osmosis at pressures of about 1,000 pounds per square inch. As a result, the membrane must be supported in such a way that it will not rupture under such high operating pressures.

Heretofore, many different types of supports have been proposed for membranes. For example, one proposal employs a tubular membrane within a perforated metal support tube, generally formed of stainless steel to resist corrosion. Another proposal utilizes membranes in sheet form backed by a solid block of porous material such as a sintered ceramic, and which is of a thickness sufficient to withstand the pressures involved in reverse osmosis. A third proposal utilizes tubular membranes within a tube formed by intricately winding fiberglass strands about a mandrel and impregnating the same with resin in such a way that the tube is porous and yet is capable of withstanding reverse osmosis operating pressures. Still another proposal employs a support tube for a tubular membrane structure formed of a relatively cheap metal and lined with a longitudinally grooved plastic insert with both the support tube and the insert being imperforate with solvent collection being facilitated by the grooves in the plastic insert which may be formed simply by conventional extrusion processes.

Of the foregoing proposals, the first two are relatively impractical and have not been employed to any significant degree. Specifically, the cost of stainless steel and the expense of perforating the same suggests that a perforated stainless steel tube as a support means is economically unfeasible. In the case of a porous block as a membrane support, the excessive bulk of the block is a significant drawback.

The third proposal has seen some use but the cost of forming the delicate tubes which, in practice, are used with the membrane cast and bonded to the interior surface thereof, has tended to limit their use. And all of the first three proposals have a common drawback. Specifically, since the solvent is exuded through pores or perforations into the open to be collected, the same can be relatively easily contaminated.

The fourth proposal to date offers the most promise in that it may be used in conjunction with a disposable membrane structure received within the plastic liner so that when a membrane has served its usefulness, it may be removed and replaced. This feature has a significant advantage over fiberglass wound porous tubes which, in practice, are disposed of when the membrane fails. The structure has the further advantage of permitting the solvent to be collected in a closed space at the interface between the membrane structure and the plastic liner to avoid contamination. However, even with the use of an imperforate tube which may be formed of a cheap metal and lined with plastic, the cost of the metal tube and the lining process contributes substantially to the cost of the equipment.

Furthermore, the bulk of the structures formed by the foregoing proposals have made it somewhat difficult to provide reverse osmosis liquid separation equipment of small size and in particular, apparatus which may be self-contained, due to the relatively hefty nature of the membrane supports and/or the use of a solvent collection space exterior of the membrane supporting tube or surface.

SUMMARY OF THE INVENTION

It is the principal object of the invention to provide a new and improved reverse osmosis separation apparatus that may be constructed more economically than those heretofore known.

More specifically, it is an object of the invention to provide a support for a membrane in reverse osmosis equipment that need not be capable, in and of itself, of withstanding the high pressures encountered in reverse osmosis operations thereby permitting the support to be formed of inexpensive, low strength material in such a way as to occupy a minimum amount of space to thereby provide a multi-cell module ideally suited for use in a self-contained reverse osmosis liquid separation unit.

The exemplary embodiment of the invention achieves the foregoing objects in a membrane module employing tubular membranes of the disposable type mentioned previously in conjunction with liquid impervious, thin-walled support tubes which may be formed of plastic or the like. The support tubes may be fabricated in such a way as to be incapable of withstanding prolonged exposure to reverse osmosis operating pressures but are arranged in conjunction with a tubular casing having substantial hoop strength so as to balance out the forces due to high pressure within the casing between adjacent support tubes so that substantially all pressure is borne by the exterior casing. Each of the thin-walled tubes is provided with a discontinuous outer surface, in the exemplary embodiment, configured in the shape of a hexagon, and all are received within the tubular casing in such a way that each tube is in contact with another tube or the interior of the casing about its entire peripheral extent. If desired, the fabrication of the module may be simplified through the use of wedges as part of the casing, which wedges have a first surface conforming to the shape of the interior of the tube forming the casing and an opposite surface that is discontinuous and conforms to the shape of the exterior of a bundle of the thin-walled tubes.

The thin-walled tubes are preferably formed of plastic for corrosion resistance and economy of material and may be easily and simply extruded. Each tube may then receive a disposable semipermeable membrane structure within its interior as mentioned previously and is adapted to conduct purified solvent permeating the membrane from the interface of the membrane structure and the tube to a solvent collection point.

Because of the compactness of a membrane module made according to the invention, the same may be employed with ease in a totally self-contained reverse osmosis liquid separation apparatus forming part of the invention. The self-contained unit employs an elongated tubular casing having substantial hoop strength to withstand the reverse osmosis operating pressures and includes a liquid mixture inlet, a liquid mixture outlet and a solvent outlet. Disposed within the casing is a pump which is in fluid communication with the inlet for receiving a liquid mixture and placing the same under reverse osmosis operating pressures. Also contained within the casing is a motor for driving the pump.

The casing further includes a plurality of elongated tubular membrane cells each having a semipermeable membrane and which are received in thin-walled tubes of the type mentioned previously. One end of each membrane structure communicates with the adjacent ends of similar membrane structure to provide for recirculation of the liquid mixture within the membrane cells. The opposite ends of the membrane structures open adjacent a high pressure space which receives the liquid mixture under pressure from the pump and which has an impeller driven by the pump motor located therein. Also within the space and located between the adjacent ends of the membrane cells is an arrangement of baffles. As a result, through the driving of the impeller by the motor and the arrangement of baffles, a continuous circulation of the liquid mixture to be separated is maintained through the membrane cells.

The exemplary embodiment also includes a pressure control valve in the liquid mixture outlet to permit the concentrated liquid mixture to flow from the casing only when the desired reverse osmosis operating pressure is maintained therein. Also interposed between the pump and the liquid mixture outlet is a pneumatic accumulator which serves to dampen pressure pulses within the casing caused by operation of the pump.

Other objects and advantages of the invention will become apparent from the following specification taken in conjunction with the accompanying drawings.

DESCRIPTION OF THE DRAWINGS

FIG. 1 is a fragmentary vertical section of a reverse osmosis membrane module made according to the invention;

FIG. 2 is an enlarged, fragmentary vertical section taken approximately along the line 2—2 of FIG. 1;

FIG. 3 is a fragmentary cross sectional view of a thin-walled tube employed in the invention;

FIG. 4 is a fragmentary plan view of a baffle employed in the module illustrated in FIG. 1; and FIG. 5 is a perspective view of a self-contained unit for separating the components of a liquid mixture by reverse osmosis utilizing a module generally similar to that illustrated in FIG. 1 with parts broken away for clarity, and is comprised of FIGS. 5A and 5B with FIG. 5B to be located to the right of FIG. 5A.

DESCRIPTION OF THE PREFERRED EMBODIMENT

An exemplary embodiment of a membrane module made according to the invention is illustrated in FIG. 1 and may be seen to comprise an elongated, tubular casing, generally designated 10, which may be formed of resin reinforced fiber-glass so as to possess substantial hoop strength. Closing the ends of the casing 10 are a pair of end caps 12 which may be held in place by retaining rings 14 received in grooves 16 in the inner surface of the casing 10.

As seen in FIG. 1, the left-most end cap 12 includes a tapped bore 18 to serve as an inlet for the liquid mixture to be processed. The right-most end cap 12 includes a similar tapped bore 20 which may serve as the outlet for the liquid mixture being processed.

Each end cap 12 includes a peripheral groove 22 which may receive an O-ring 24 for sealing purposes.

Within the casing 10 and extending between the end caps 12 are a plurality of elongated, tubular membrane cells, generally designated 26. Each membrane cell 26 is formed of an imperforate tube 28 which serves as a pure liquid directing means, and a unitary membrane structure, generally designated 30, which may be formed according to the teachings of my U.S. Pat. No 3,581,900 which is a continuation-in-part of my copending application Ser. No. 724,663, now abandoned. For purposes of understanding this invention it is sufficient to note that each unitary membrane structure 30 is formed of an outer, porous paper tube 32 having a tubular semipermeable membrane film 34 cast on its interior and further having liquid impervious plastic ferrules 36 on the ends thereof.

Turning now to FIGS. 2 and 3, the nature of the pure liquid directing means 28 may be seen. With specific reference to FIG. 2 each is seen to comprise a tube having a generally circular inner surface 38 and a hexagonal outer surface 40 having all sides of an equal length. As best seen in FIG. 3, the circular inner surface 38 is provided with a plurality of longitudinally extending grooves 42 for liquid direction purposes. Specifically, pure liquid permeating the membrane film 34 and the porous paper tube 32 surrounding the same will flow to the interface of the unitary membrane structure 30 and the support tube 32 and may flow longitudinally within the grooves 42 to the end of each of the pure liquid directing tubes 28 for collection as will be seen.

Returning to FIG. 2, a bundle comprised of a plurality of the pure liquid directing tubes 28 is received in nesting relation within the interior of the casing 10 in such a way as to form a honeycombed structure. Stated another way, the tubes 28 are received within the casing so that the exterior of each is in contact with the exterior of one or more adjacent ones of the tubes 28 or with a casing wedge member 44 having an irregular surface 46 geometrically configured to the shape of the exterior of the tubes 28. The wedge member 44 further includes an arcuate outer surface 48 in abutment with the inner surface of the casing 10. For ease of assembly of the module, the wedge member 44 is preferably formed separately from the casing although it could be integral therewith. Furthermore, while one single circular wedge member could be used, it is desirable that a plurality of wedge members, sufficient to complete a circle be used, again for ease of assembly.

It will therefore be apparent that each of the liquid directing tubes 28 is in contact, about its entire peripheral extent, with other ones of the tubes 28 and, in some instances, with the wedge member 44 as well. The purpose of this construction will be explained in greater detail hereinafter.

Returning now to FIG. 1, the plastic ferrules 36 of each membrane structure 30 extend from each end of the associated liquid directing tube 28 through a seal and baffle plate 50, a high pressure area 52 and terminate in gross seals 54, the latter being in substantial abutment with the innermost side of the respective end caps 12. Referring first to the gross seals 54, each includes a plurality of apertures 56 which receive the ends of the plastic ferrules 36 and which are aligned with redirecting channels 58 in the end cap. Of course, one of the apertures 56 in one gross seal 54 is in alignment with the inlet bore 18 while another aperture 56 on the opposite gross seal 54 is in alignment with the outlet bore 20.

The purpose of the gross seals 54 is to insure that the liquid mixture entering the inlet will be passed through each membrane cell 26 in generally the proper order as defined by the arrangement of redirecting channels 58 in both end caps 12 to the outlet 20. However, the same does not have to provide an extremely good seal such that the liquid mixture cannot flow between the interface of the plastic ferrule 36 and the gross seal 54 to the high pressure area 52, it being sufficient that the seal preclude any significant flow through such interface. In fact, it is desirable that a certain amount of the liquid under pressure flow through the interface to the high pressure areas 52 for purposes to be seen.

The purpose and construction of the seal and baffle plates 50 can best be understood with reference to FIGS. 1 and 4. Each seal and baffle plate 50 includes a plurality of apertures 60 aligned with the interiors of the tubes 28 and through which the ferrules 36 extend. On the inwardmost side of each seal and baffle plate 50 are a plurality of grooves 62 interconnecting each aperture 60 and ultimately leading to the aperture 60 aligned with the centermost one of the tubes in the bundle.

On the opposite side of each seal and baffle plate 50 is a sealing element 64 which is secured thereto by any suitable adhesive or which, in the alternative, may be integral therewith. Each seal 64 includes a plurality of apertures 66 which are aligned with the apertures 60 but are of a smaller diameter so that a small flap 68 overlies each aperture 60. The entire periphery of each seal and baffle plate 50 is provided with a similar flap 69.

With reference to FIG. 1, when a ferrule 36 is located within each aperture 60 in the seal and baffle plate 50 and extends therethrough into the gross seal 54, the flaps 68 as well as the flaps 69 will be directed outwardly, with the flaps 68 tightly surrounding the plastic ferrules 36 and the flap 69 being in tight engagement with the interior of the casing 10. That is, the flaps 68 and 69 will be in engagement with the ferrules 36 and the casing 10 respectively and extend into the high pressure area 52.

As a result of the foregoing construction, when a liquid mixture under reverse osmosis operating pressure is introduced into the inlet 18, a certain amount of the same will pass through the interface of the gross seal 54 and the ferrules 36 to enter the high pressure area 52 and bear against the exterior of the flaps 68 and 69. Such pressure will then cause the flaps 68 to tightly embrace respective ferrules 36 providing a total seal and cause the flap 69 to tightly embrace the interior of the casing 10 for the same purpose. The higher the pressure within the high pressure area 52, the tighter the seal provided by the flaps 68 and 69 and for this reason, a certain amount of fluid communication through the interface of the ferrules 36 and the gross seals 54 to the high pressure area 52 is desired as mentioned previously.

The module is completed by a pair of outwardly extending pure water outlet tubes 69 which extend through central bores 72 in respective ones of the end caps 12. Each bore 72 is provided with a peripheral interior groove 74 which may receive an O-ring 76 to sealingly engage a respective outlet tube 70.

The innermost ends of each outlet tube 70 are flared as at 78 to retain the same within the central aperture 60 in each seal and baffle plate 50. The flared ends 78 are in alignment with a central one of the tubes 28, hereinafter designated 80, which, unlike the tubes 28, is formed of sufficient strength to withstand reverse osmosis operating pressures. It is to be further noted that a small gap 82 exists between the flared end 78 and the corresponding end of the tube 80.

In operation, a liquid mixture under reverse osmosis operating pressure is introduced into the inlet 18 to flow through each membrane cell 26 and ultimately pass out of the module via the outlet 20. A portion of the solvent of the liquid mixture will permeate the membrane film 34 in each membrane structure 30 and pass through the porous paper tube 32 surrounding the same to the interface of the paper tube 32 and the interior of the liquid directing tubes 28. At this point, the pure solvent will pass along the grooves 42 in the liquid directing tube 28 towards the seal and baffle plates 50. Upon reaching the baffle plates 50, the pure solvent may flow in the grooves 62 in the innermost face thereof to the centermost aperture 60 in the baffle 50. At this point, it will be adjacent the pure solvent outlet 70 and may be removed from the module to be used or disposed of as desired. In this respect, the center tube 80 provides for fluid flow of the pure solvent from one end of the module to the other so that a given one of the pure solvent outlet tubes 70 could be plugged if desired.

It will be appreciated that the foregoing mode of operation requires that there be substantial pressure within each membrane cell which is exerted outwardly in a way such as to tend to rupture each liquid directing tube 28. However, since each liquid directing tube 28 is in abutment with other ones of the tubes 28 or the wedge member 44 about its entire peripheral extent, and because there is substantially equal pressure from the interior of one membrane cell 26 to the next, the tubes 28 are self-supporting and transmit all such pressure to either the centermost tube 80 which, it will be recalled, is fabricated so as to withstand reverse osmosis operating pressures, or to the wedge member 44 for transmission to the tubular casing 10. Since the tubular casing 10 is made with substantial hoop strength, it is capable of withstanding the pressures transmitted to it and it will therefore preclude the individual tubes 28 from rupturing.

The just-described construction has a number of advantages over constructions heretofore known. For one thing, the liquid directing support tubes 28 for each membrane cell need not be capable of individually withstanding reverse osmosis operating pressures which customarily, in the case of seawater desalting, run 1,000 psi or more. For such an operation, it will generally be sufficient if the tubes 28 can individually withstand an internal pressure on the order of 40–50 psi. As a result, the tubes may be fabricated with relatively thin walls thereby minimizing the amount of material required in their fabrication. Furthermore, various materials having desirable corrosion resistant characteristics but not known for strength characteristics may be employed. For example, a variety of inexpensive plastics, not subject to corrosion, may be used in fabricating the tubes 28. Secondly, because the construction does not require void spaces between the exterior of the support tubes and because the tubes may be relatively thin-walled, a greater number of tubes 28 and thus a greater number of membrane cells 26 may be accommodated in a casing having a given bulk. As a result, for a given casing bulk, the total membrane area contained within the casing may be increased over that obtainable in prior art constructions by employing the principles of the invention so that the total separation capacity of the unit for a given time period may be increased.

Referring now to FIG. 5, the principles employed in the membrane module shown in FIGS. 1 and 4 are shown, in somewhat modified form, in a totally self-contained reverse osmosis liquid mixture separation unit. The self-contained unit includes an elongated, tubular casing, generally designated 100 which may be formed similarly to the casing 10. At the leftmost end thereof there is located an end plate 102 having a peripheral groove 104 which may receive an O-ring 106 for sealing purposes. A retaining ring 108 is located outwardly of the end plate 102 and received in an interior groove 110 in the end of the casing 100.

The end plate 102 includes a central, tapped bore 112 which may receive an inlet pipe 114 through which the liquid mixture to be processed may be supplied to the unit. The innermost end of the bore 112 includes a plurality of radial bores 116 (only one of which is shown) connected to corresponding tubes 118 in communication with a respective cylinder 120 of a positive displacement piston pump 122. Also within the cylinder 120 is a piston 124 which is connected by a connecting rod (not shown) to a crank shaft 126. In the exemplary embodiment, the pump 122 includes three such cylinders and pistons 120 and 124 respectively, all driven by the crank shaft 126.

The crank shaft 126 is driven through suitable gearing 128 by a motor 130 within the housing. The motor 130 may be electrically operated and to this end, a conventional outlet cord 132 is provided and extends through a bore 134 and cooperating sealing means 136 to the exterior of the casing for connection to a source of electrical power. The motor 130 is itself located within a housing 138 within the casing 100, which housing 138 contains cooling oil for the motor 130. The housing 138 is also provided with a plurality of conduits 140 (only one is shown) connected to the outlets of the pump cylinders 120 so that the liquid mixture to be processed, after being placed under reverse osmosis operating pressure by the pump 122, will flow therethrough to membrane cells within the unit.

The passage of the liquid mixture through the conduits 140, provides two beneficial results. Firstly, the liquid mixture will pick up heat from the oil within the housing 138 surrounding the motor 130 to thereby provide a cooling action for the motor 130. Secondly, the heat added to the liquid mixture in the process of cooling the motor will increase the temperature of the liquid mixture prior to its introduction into the membrane cells of the unit. The relatively higher temperature of the liquid mixture will result in an increased separation efficiency over that obtainable if the liquid mixture were applied to the membrane cells at the same temperature it entered the inlet tube 114.

Suitable O-ring seals 142 may be located at the ends of housing 138 in sealing engagement to the periphery of the same as well as the interior of the casing 100.

Returning to the conduits 140, it will be seen that each (only one is shown) includes an outlet 146 in a high pressure area, generally designated 144. Within the high pressure 144 is an impeller 148 which is driven by an output shaft 150 of the motor 130. It has been determined that operation of the impeller 148 requires very little energy and therefore need not be positively locked to the output shaft 150. Accordingly, in order to eliminate any need for a high pressure seal at a point of emergence of the shaft 150 from the housing 138, a magnetic coupling, generally designated 152, is employed to link the impeller 148 to the shaft 150.

As is apparent from FIG. 5A, one side of the high pressure area 144 is bounded by the rightmost end of the housing 138. The other side of the high pressure area 144 is bounded by a seal and baffle plate 154 bearing a seal sheet 156 and constructed similarly to the seal and baffle plate 50 illustrated in FIG. 4. Extending from the ends of the seal and baffle plate 154 are the ends of plastic ferrules 158 of unitary membrane structures constructed identically to those illustrated in FIG. 1 and which are received in liquid directing tubes 160 identical to those described previously.

Adjacent the impeller 148 and interposed between the open ends of the plastic ferrules of various ones of the unitary membrane structures are vanes 162 which extend into the high pressure area 144. The arrangement of the vanes 162 is such that, from a flow standpoint, the outermost ones of the membrane cells are separated from the innermost ones of the membrane cells for purposes to be seen.

As best seen in FIG. 5B, a honeycomb structure is defined by a bundle of the tubes 160 and the same, like the tubes 28, are nested within the casing 100 so that their entire peripheral extent is in contact with adjacent tubes 160 or wedge members 164. The wedge members 164 are shown as a plurality of separate elements for ease of insertion into the casing 100.

The ends of the tubes 160 opposite the high pressure area 144 are received in a seal and baffle plate 166 generally similar to the seal and baffle plate 154. That is, the seal and baffle plate 166 is formed in a manner similar to the seal and baffle plate 50 illustrated in FIG. 4 and plastic ferrules 158 on each unitary membrane structure (not shown) extend therethrough into a second high pressure area, generally designated 168. The high pressure area 168 is further defined by an end plate 170 which may be held within the casing 100 by a retaining ring 172 received in an interior peripheral groove 174 near the end of the casing 100. To prevent leakage, the end plate 170 is provided with a peripheral groove 176 which receives an O-ring seal 178 which sealingly engages both the end plate 170 and the interior of the casing 100.

Disposed within the second high pressure area 168 is a doughnut-shaped tube 180 having resilient walls and having the interior thereof connected by means of a fitting 182 and an associated conduit 184 passing through a bore 186 in the end plate 170 to a charging valve 188 exterior of the casing. The tube 180 serves as an accumulator and may be precharged through the valve 188 with a compressible fluid under pressure for purposes to be seen.

The end plate 170 is further provided with a central bore 190 through which a pure solvent outlet conduit 192 extends. The interior end 193 of the outlet conduit 192 is in alignment with a centermost one of the tubes 160, designated 194, which receives the pure solvent permeating the membrane as directed therethrough by the seal and baffle plates 154 and 166 in the same general manner mentioned previously in conjunction with the description of FIGS. 1 and 4. Of course, it is to be understood that a suitable seal (not shown) must be provided for the centermost aperture of the seal and baffle plate 150 adjacent the high pressure area 144 so that the liquid mixture to be processed cannot enter the pure solvent flow path. Also, as was the case with the centermost tube 80 in the module illustrated in FIG. 1, the centermost tube 185 illustrated in FIG. 5 must be constructed so as to be capable of withstanding reverse osmosis operating pressures.

The bore 190 includes a peripheral groove 196 receiving an O-ring seal 198 to preclude the passage of the liquid mixture through the bore 190 to the exterior of the casing.

Finally, the end cap 170 includes another bore 200 which may receive a pressure regulating valve 202. The pressure regulating valve 202 may be set so as to maintain a desired pressure within the casing 100 and to discharge a portion of the mixture from the casing when the predetermined pressure is exceeded.

The operation of the self-contained unit is as follows. When the motor 130 is energized, the pump 122 will be placed in operation to draw the liquid mixture to be processed into the casing 100 through the conduit 114. The liquid mixture will be placed under reverse osmosis operating pressures by the pump 122 and pass through the conduit 140, cooling the oil surrounding the motor 130 in the process to the first high pressure area 144.

The liquid mixture, now at an elevated temperature, will pass into the various membrane cells and ultimately fill the second high pressure area 168.

A portion of the solvent of the liquid mixture will pass through the membrane of each membrane cell to the interface of each membrane structure and its corresponding tube 160 and that portion of the pure solvent flowing through the baffle plate 154 will be directed centrally by the same to the centermost tube 194 from whence it may flow to the pure solvent outlet 192. By the same token, the pure solvent flowing to the baffle 166 will be similarly directed to the outlet 192.

Throughout the foregoing, circulation of the liquid mixture through individual membrane cells will be achieved by operation of the impeller which will be driven through the magnetic coupling 152 by the pump motor 130. Specifically, the same will tend to direct the liquid mixture outwardly toward the interior casing wall which, in turn, will deflect the liquid mixture into the outermost ones of the membrane cells to flow therethrough toward the high pressure area 168. Because this action of the impeller 148 tends to exhaust some of the liquid mixture from the high pressure area 144, and because the vanes 162 separate the outermost ones of the membrane cells from the innermost membrane cells, a small pressure differential will exist in the high pressure area 144 from the center thereof to the outermost portions of the same. Accordingly, the liquid mixture in the innermost ones of the membrane cells will flow toward the high pressure area 144 and, as a consequence, withdraw some of the mixture from the high pressure area 168. As a result, the following flow path for the liquid mixture will exist. Liquid mixture in the high pressure area 144 will flow through the outermost ones of the membrane cells to the high pressure area 168 and flow therefrom through the innermost ones of the membrane cells back to the high pressure area 144.

As the pump continues to operate, occasionally the predetermined pressure mentioned earlier in conjunction with the valve 202 will be exceeded and when such occurs, the valve 202 will open to permit a portion of the liquid mixture under pressure to exit the casing 100. When a sufficient amount of the liquid mixture has been discharged so as to lower the pressure, the valve 202 will again close. In this manner, the concentrated liquid mixture is periodically discharged.

It should also be noted that during the foregoing operation, pressure pulses due to the operation of the positive displacement pump 122 will be absorbed by the tube 180 in the second high pressure area 168 which acts as an accumulator. Accordingly, stress on the casing 100 is minimized.

I claim:

1. In a membrane module for use in reverse osmosis liquid mixture separation processes, the combination comprising:
    a. an elongated tubular casing having substantial hoop strength and capable of withstanding reverse osmosis operating pressures without rupture,
    b. a plurality of tubular membrane structures within said casing each including an inner surface defined by a tubular, semipermeable membrane,
    c. a plurality of elongated thin-walled tubes within said casing each surrounding and receiving a corresponding membrane structure, most of said tubes having a hexagonal outer surface and being interfitted in abutment with each other and said casing to define a honeycomb structure, d. solvent directing means located at the interface of each membrane structure and its associated tube for directing the solvent in a liquid mixture permeating through the associated membrane to at least one end of the corresponding tube, e. a solvent collection manifold, including a solvent outlet, in fluid communication with said one end of each of said tubes, and f. means for directing a liquid mixture under reverse osmosis operating pressures to the interior of each of said tubular membranes.

2. A membrane module according to claim 1 wherein said tubes consist essentially of a plastic.

3. A membrane module according to claim 1 wherein all of said tubes have a hexagonal outer surface and are interfitted in a bundle within said casing; and further including wedge means interposed between the interior of said casing and said bundle, said wedge means having one surface configured to the shape of the interior surface of said casing and a surface opposite said one surface configured to the shape of the exterior of said bundle.

4. In a membrane module for use in reverse osmosis liquid mixture separation processes, the combination comprising:

a tubular casing capable of withstanding reverse osmosis operating pressures without rupture;

a plurality of tubular membrane structures within said casing each including an inner surface defined by a tubular, semipermeable membrane;

a plurality of elongated thin-walled tubes within said casing each surrounding and receiving a corresponding membrane structure, most of said tubes having a geometrically discontinuous outer surface and being interfitted in abutment with each other or said casing about their entire peripheral extent;

solvent directing means located at the interface of each membrane structure and its associated tube for directing the solvent in a liquid mixture permeating through the associated membrane to at least one end of the corresponding tube;

a solvent collection manifold, including a solvent outlet, in fluid communication with said one end of each of said tubes; and means for directing a liquid mixture under reverse osmosis operating pressures to the interior of each of said tubular membranes.

5. In a membrane module for use in reverse osmosis liquid mixture separation processes, the combination comprising:

a. a tubular casing having substantial hoop strength and capable of withstanding reverse osmosis operating pressures without rupture;

b. wedge means within said casing and having a first surface configured to conform to the shape of the inner surface of the casing and in abutment therewith, and a second discontinuous surface opposite said first surface;

c. a plurality of tubular membrane structures within said casing and said wedge means each including an inner surface defined by a tubular, semipermeable membrane;

d. a plurality of elongated thin-walled tubes within said casing and said wedge means each surrounding and receiving a corresponding membrane structure, all of said tubes having a geometrically discontinuous outer surface with each tube being interfitted in abutment with at least one of the other tubes, said casing and said wedge means about its entire peripheral extent;

e. solvent directing means located at the interface of each membrane structure and its associated tube for directing the solvent in a liquid mixture permeating through the associated membrane to at least one end of the corresponding tube;

f. a solvent collection manifold, including a solvent outlet, in fluid communication with said one end of each of said tubes; and g. means for directing a liquid mixture under reverse osmosis operating pressures to the interior of each of said tubular membranes.

6. A membrane module according to claim 5 wherein said tubes are formed of plastic.

7. A self-contained unit for separating the components of a liquid mixture by reverse osmosis comprising:

a. an elongated tubular casing having substantial hoop strength and capable of withstanding reverse osmosis operating pressures;

b. a liquid mixture inlet in said casing;

c. a liquid mixture outlet in said casing;

d. a solvent outlet in said casing;

e. a pump within said casing and in fluid communication with said liquid mixture inlet for receiving the liquid mixture from the inlet and placing the same under reverse osmosis operating pressures;

f. a motor within said casing for driving said pump;

g. a plurality of elongated, tubular membrane cells within said casing, each having a tubular, semipermeable membrane;

h. means associated with said pump for directing the liquid mixture under reverse osmosis operating pressures to the interior of said semipermeable membranes;

i. means associated with the exterior of said semipermeable membranes for receiving solvent permeating therethrough and directing the same to said solvent outlet; and j. an impeller adjacent one end of each membrane cell for impelling the liquid mixture through the interior of each semipermeable membrane, said impeller being within said casing and being driven by said motor.

8. A unit according to claim 7 further including pulsation dampening means interposed between said pump and said liquid mixture outlet for dampening pressure pulses in said liquid mixture under reverse osmosis operating pressures caused by said pump.

9. A self-contained unit for separating the components of a liquid mixture by reverse osmosis according to claim 7 wherein said means for directing the liquid mixture to the semipermeable membranes includes heat exchange means in heat exchange relation with said motor so that the liquid mixture will cool said motor and, in turn, have its temperature increased to increase the separating efficiency of the unit.

10. A self-contained unit for separating the components of a liquid mixture by reverse osmosis comprising:
   a. a casing capable of withstanding reverse osmosis operating pressures;
   b. a liquid mixture inlet in said casing;
   c. a liquid mixture outlet in said casing;
   d. a solvent outlet in said casing;
   e. a pump within said casing and in fluid communication with said liquid mixture inlet for receiving the liquid mixture from the inlet and placing the same under reverse osmosis operating pressures;
   f. a motor for driving said pump;
   g. a plurality of membrane cells within said casing, each having a semipermeable membrane;
   h. means associated with said pump for directing the liquid mixture under reverse osmosis operating pressures to one side of said semipermeable membranes;
   i. means associated with the other side of said semipermeable membranes for receiving solvent permeating therethrough and directing the same to said solvent outlet; and
   j. pulsation dampening means within said casing and interposed between said liquid mixture outlet and said pump for dampening pressure pulses in said liquid mixture caused by said pump.

11. A self-contained unit for separating the components of a liquid mixture by reverse osmosis comprising:
   a. an elongated tubular casing having substantial hoop strength and capable of withstanding reverse osmosis operating pressures;
   b. a liquid mixture inlet in said casing;
   c. a liquid mixture outlet in said casing;
   d. a solvent outlet in said casing;
   e. a pump within said casing and in fluid communication with said liquid mixture inlet for receiving the liquid mixture from the inlet and placing the same under reverse osmosis operating pressures;
   f. a motor within said casing for driving said pump;
   g. a plurality of elongated, tubular semipermeable membranes within said casing;
   h. means associated with said pump for directing the liquid mixture under reverse osmosis operating pressures to the interior of said semipermeable membranes; and
   i. means associated with the exterior of said semipermeable membranes for receiving solvent permeating therethrough and directing the same to said solvent outlet and including a plurality of elongated thin-walled tubes within said casing and each surrounding and receiving a corresponding one of said tubular membranes, most of said tubes having a geometrically discontinuous outer surface and being interfitted in abutment with each other or said casing about their entire peripheral extent.

12. Liquid mixture separation reverse osmosis apparatus comprising:
   a. a casing capable of withstanding reverse osmosis operating pressures;
   b. a liquid mixture outlet in said casing;
   c. a solvent outlet in said casing;
   d. means for placing a liquid mixture under reverse osmosis operating pressures while within said casing;
   e. a plurality of membrane cells within said casing, each having first and second openings;
   f. means establishing fluid communication between the first opening of each membrane cell and the first opening of at least one other membrane cell so that the liquid mixture flow in one membrane cell from said first end may be directed back into another membrane cell;
   g. means defining a high pressure area adjacent the second openings of said membrane cells, said high pressure area receiving the liquid mixture under reverse osmosis operating pressures;
   h. an impeller within said high pressure area and adjacent the second openings of said membrane cells;
   i. vane means disposed between the second openings of at least some of said membrane cells and adjacent said impeller so that said impeller will circulate the liquid mixture within the membrane cells; and
   j. means establishing fluid communication between said membrane cells and said solvent outlet so that the solvent separated in each membrane cell from the liquid mixture will be directed to said solvent outlet.

* * * * *